May 3, 1966  E. A. MEYER  3,248,995
MOLDING FASTENER
Filed Oct. 27, 1961  2 Sheets-Sheet 1

INVENTOR.
Engelbert A. Meyer
BY
George A. Schmidt
ATTORNEY

May 3, 1966  E. A. MEYER  3,248,995
MOLDING FASTENER

Filed Oct. 27, 1961  2 Sheets-Sheet 2

INVENTOR.
Engelbert A. Meyer
BY
George A. Schmidt
ATTORNEY

United States Patent Office 3,248,995
Patented May 3, 1966

3,248,995
MOLDING FASTENER
Engelbert A. Meyer, Union Lake, Mich., assignor to General Motors Corporation, Detroit, Mich., a corporation of Delaware
Filed Oct. 27, 1961, Ser. No. 148,109
1 Claim. (Cl. 85—9)

This invention relates to fastening device, and more particularly to a molding fastener for securing a molding strip to a support and which permits use with supports in various positions of angularity or subsequent alignment relative to the molding strip.

In the design and manufacture of motor vehicles is is common to utilize molding strips at various places on the body for aesthetic purposes. Such molding strips are generally held in place by fastening devices, including a stud which extends through the body panel and which may be secured by a nut or other suitable means. A fastener body is generally disposed within the molding strip and engages the longitudinal flanges that are generally found along the edges of the strip. When installed, the molding strip is clamped against the surface of the body panel.

In numerous installations the design or location of the support relative to the molding strip makes it impossible to utilize conventional fastening devices because of misalignment or angular location considerations whereby the stud extending from the fastener body would not properly engage the support. These installations require a special fastening device, thus increasing the cost of the installation as well as the overall cost of the vehicle. This is objectionable.

The device in which this invention is embodied comprises, generally, a fastener assembly in which the stud portion is pivotal with respect to the body of the fastener to permit the stud to engage the support at any angle relative to the body of the fastener. The device is usable in the normal fastening installation, and in special conditions the stud may be swiveled or pivoted to extend in a direction other than normal from the fastener body. This permits the use of a single type of fastener device to retain all of the molding strips on a structure such as a vehicle.

These and other advantages will become more apparent from the following description and drawings, in which.

Figure 1:
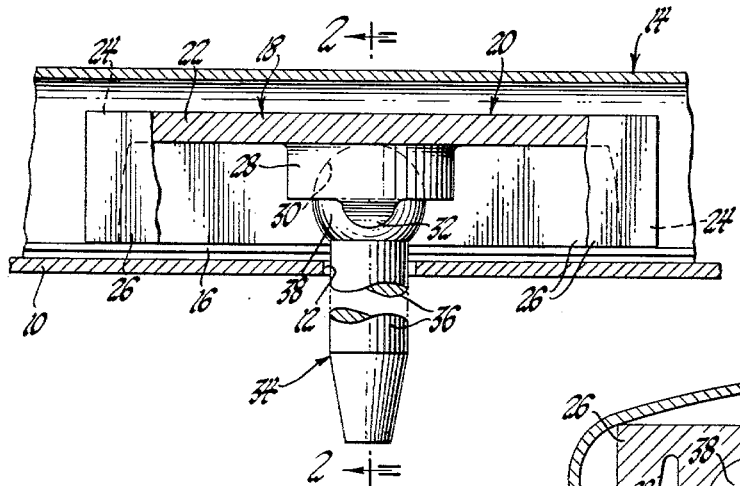
FIGURE 1 is an elevational view, with parts broken away and in section, showing a fastener assembly embodying this invention.
Figure 2:
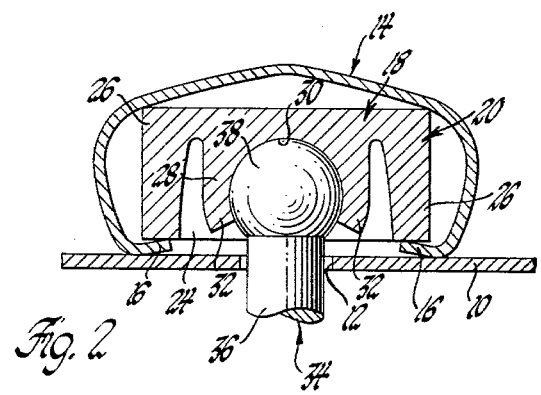
FIGURE 2 is a cross-sectional view of the fastening installation of FIGURE 1 taken substantially along line 2—2 of FIGURE 1 and looking in the direction of the arrows.

Referring more particularly to the drawings, FIGURES 1 and 2 best illustrate a typical fastener installation. A supporting panel 10 is provided with a suitable aperture 12 and has a molding strip, illustrated generally by the numeral 14, secured thereto. Molding strip 14 is of generally C shape, having flanges 16 extending longitudinally and completely along the length thereof. A fastener device, illustrated generally by the numeral 18, is received in the molding strip 14 and extends through the supporting panel 10 to clamp the molding strip 14 to the panel.

Figure 3:
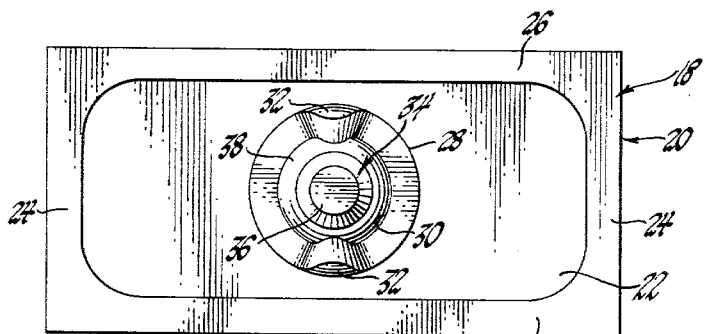
FIGURE 3 is a bottom plan view of the fastening device illustrated in FIGURES 1 and 2.

The fastener device 18, as illustrated in FIGURES 1-3, includes a body portion, illustrated generally by the numeral 20. Body portion 20 may be of any suitable material, such as plastic, and may be in the form of a plate portion 22 and downwardly extending flanges 24 and 26 at the ends and sides thereof, respectively. Flanges 26 are adapted to engage the flanges 16 formed on the molding strip 14.

Integrally formed from the plate portion 22 is a socket portion 28 which extends from the plate portion 22 in the direction of the support 10. Socket portion 28 may be provided with a spherical cavity 30 and with retaining ears 32, the purpose for which will be later described. Spherical cavity 30 may be exactly a hemisphere or may be slightly less than a hemisphere whereas retaining ears 32 continue the great circle cross-section beyond the horizontal diametral plane a slight amount. This will be more clearly understood from the following discussion.

A stud member, illustrated generally by the numeral 34, extends from the fastener body 20 and has a shank 36 which is adapted to extend through the aperture 12 in the support 10. Shank 36 may be of any conventional configuration and may or may not be threaded, depending on the type of fastening device used to retain the stud against the support 10.

Stud member 34 is provided with an enlarged head 38 which takes the form of a sphere and which is received in the spherical cavity 30 of the body 20. Since the major portion of the cavity 30 is less than or exactly hemispherical, the enlarged head 38 is easily received therein. However, ears 32 extending beyond the horizontal diametral plane are sufficient to retain the head 38 in the cavity 30 and in engagement with the body portion 20. It is seen that ears 32 must be of sufficient resilience in order to permit passage of the head 38 into the cavity 30.

With the fastening device assembled, as illustrated in FIGURES 1-3, it is seen that the stud 34 is pivotal in any direction relative to the body 20. This is because the spherical head 38 in the cavity 30 is universally rotatable. With such a fastening device it is seen that if the support 10 is not parallel to the body 20 of the fastening device, because of supporting panel design or because of misalignment upon assembly, the stud member 34 is easily pivotable in order to properly seat the fastening device.

Figure 4:
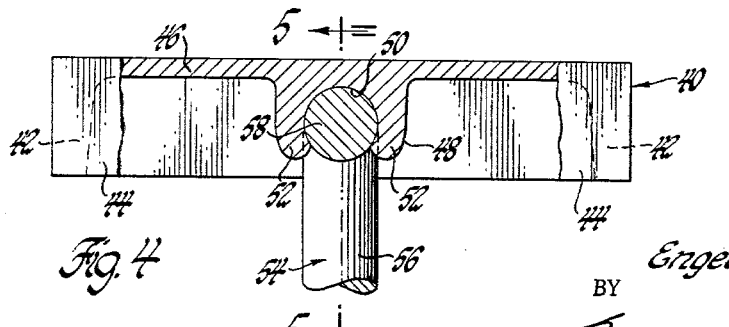
FIGURE 4 is an elevational view, with parts broken away and in section, of a modified form of the fastener device illustrated in FIGURES 1-3.
Figure 5:
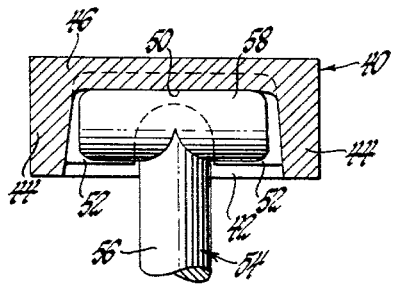
FIGURE 5 is a cross-sectional view of the fastener device of FIGURE 4 taken substantially along the line 5—5 of FIGURE 4 and looking in the direction of the arrows.
Figure 6:
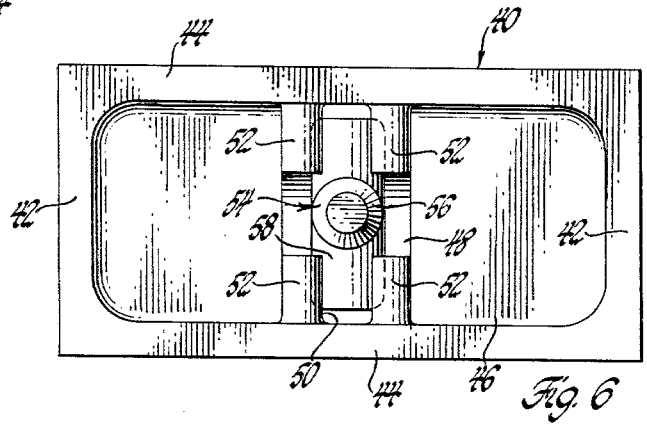
FIGURE 6 is a bottom plan view of the fastener device illustrated in FIGURES 4 and 5.

A modification of the above-described construction is illustrated in FIGURES 4-6. A body member, illustrated generally by the numeral 40, is provided with downwardly formed flanges 42 and 44 at the ends and sides, respectively, of a plate portion 46. Integrally formed from plate portion 46 is a socket portion 48 which, in this modification, is provided with a cylindrical cavity 50 extending either crosswise, as illustrated, or which may be disposed angularly or lengthwise of the body portion 40. Socket portion 48 is so formed as to provide a plurality of retaining ears 52 which extend beyond the horizontal diametral plane of the cylindrical cavity 50.

A stud member, illustrated generally by the numeral 54 and having a suitable shank 56 for receiving a nut member or the like, is provided with a cross member 58, also of cylindrical cross-section. Cross member 58 is received in the socket 50 and is retained in place by the ears 52 which extend beyond the horizontal diametral plane of the socket portion.

The modification illustrated in FIGURES 4–6 is seen to be pivotal in a plane normal to the axis of the cross member 58 and containing the axis of shank 56. The socket 50 may be so located as to change the pivotal plane as desired, by changing the position of socket portion 48. It is seen that if the fastening device is to be mounted such that the body 40 is not parallel to the supporting panel, the stud portion 54 may be swiveled for proper alignment and fastening.

Figure 7:
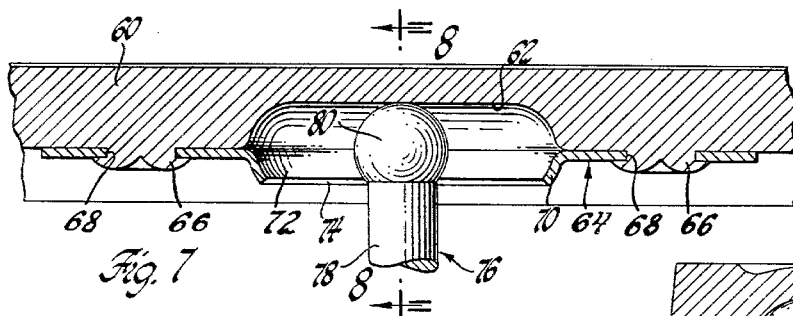
FIGURE 7 is an elevational view, with parts broken away and in section, of a second modification of the fastener device illustrated in FIGURES 1-3.
Figure 8:
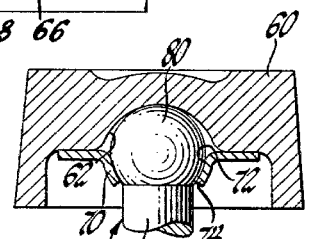
FIGURE 8 is a cross-section view of the fastener device of FIGURE 7 taken substantially along the line 8—8 of FIGURE 7 and looking in the direction of the arrows.
Figure 9:
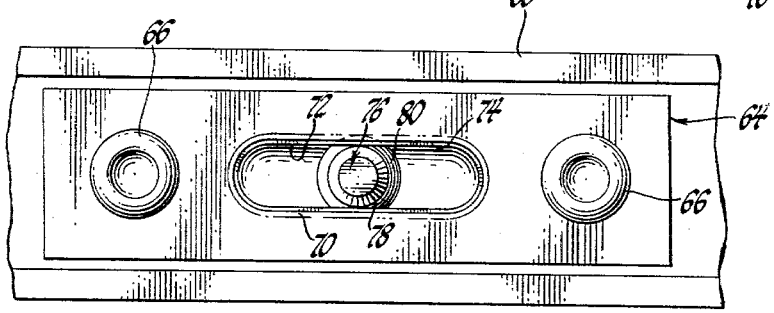
FIGURE 9 is a bottom plan view of the fastener device illustrated in FIGURES 7 and 8.

FIGURES 7–9 illustrate a second modification of the fastening device. A body portion 60 has an elongated cavity 62 formed in the surface thereof adjacent the supporting panel. Elongated cavity 62 may be of any convenient shape but is preferred to be of cylindrical configuration, as shown in FIGURE 8. Secured to the underside of body portion 60 is a plate member, illustrated generally by the numeral 64, which is secured to the body 60 in any suitable manner, as by retention means 66. Retention means 66 may be in the form of expandable buttons or the like which are received in suitable apertures 68 in plate member 64. Also formed in plate member 64 is an elongated depression 70 which is of generally cylindrical configuration. Plate member 64 is mounted on body 60 such that the depression 70 and the cavity 62 are in registry to form a generally cylindrical cavity 72. Plate member 64 has a slot 74 formed lengthwise of the cavity 70 for purposes which will become later apparent.

A stud member 76 is received in the socket 72 and is provided with a shank 78 suitable for securement in a supporting panel. Stud member 76 is provided with an enlarged head 80 which may take the form of a sphere for receipt in the elongated cavity 72. With such a construction it is seen that stud member 76 is pivotable relative to the body 60 and is also slidable in the slot 74 throughout the extent of its length. This again permits almost universal positioning of the stud member relative to the body and thus the fastening device relative to the supporting panel.

Thus, a fastening assembly is provided which permits use in conventional applications as well as special applications where a molding strip is secured to a support. If the support is angularly disposed relative to the body of the fastening device, the stud portion is easily swivelable for proper retention of the molding strip on the support. This permits the use of a single type of fastener device throughout a series of installations, such as on a motor vehicle.

What is claimed is:

A fastener for securing a molding strip to a support, and comprising:
 a body receivable in said molding strip and having an elongated cavity formed therein;
 a plate member secured to said body adjacent said cavity and having an elongated depression formed therein, said depression and said cavity forming an elongated socket, said depression having a slot formed therein and extending longitudinally thereof;
 a stud member having a shank adapted to engage said support and a spherical head received in said elongated socket, said shank extending outwardly from said socket through said slot, said stud member being pivotal with respect to said body to permit alignment of said molding strip on said support.

References Cited by the Examiner
UNITED STATES PATENTS

| | | | |
|---|---|---|---|
| 2,695,434 | 11/1954 | Bedford | 85—9 X |
| 2,804,321 | 8/1957 | Walker | 85—9 X |

FOREIGN PATENTS

| | | |
|---|---|---|
| 140,969 | 4/1951 | Australia. |
| 529,069 | 11/1940 | Great Britain. |

RICHARD W. COOKE, JR., *Primary Examiner.*